(12) United States Patent
Wright

(10) Patent No.: US 8,374,638 B2
(45) Date of Patent: *Feb. 12, 2013

(54) SYSTEM AND METHOD FOR PROVIDING A PROXY IN A SHORT MESSAGE SERVICE (SMS) ENVIRONMENT

(75) Inventor: Michael A. Wright, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/046,938

(22) Filed: Mar. 14, 2011

(65) Prior Publication Data

US 2011/0165899 A1 Jul. 7, 2011

Related U.S. Application Data

(63) Continuation of application No. 11/070,021, filed on Mar. 2, 2005, now Pat. No. 7,941,165.

(51) Int. Cl.
*H04W 4/00* (2009.01)
*G06F 15/16* (2006.01)
(52) U.S. Cl. ........................ 455/466; 709/206
(58) Field of Classification Search ............... 455/466, 455/445, 458; 370/351, 401, 352; 705/206
See application file for complete search history.

(56) References Cited

U.S. PATENT DOCUMENTS

| | | | |
|---|---|---|---|
| 5,577,103 A | 11/1996 | Foti | |
| 5,768,276 A | 6/1998 | Diachina et al. | |
| 5,878,351 A | 3/1999 | Alanara et al. | |
| 5,915,222 A | 6/1999 | Olsson et al. | |
| 6,041,047 A | 3/2000 | Diachina et al. | |
| 6,078,820 A | 6/2000 | Wells et al. | |
| 6,097,961 A | 8/2000 | Alanara et al. | |
| 6,101,393 A | 8/2000 | Alperovich et al. | |
| 6,108,325 A | 8/2000 | Stephanson et al. | |
| 6,125,281 A | 9/2000 | Wells et al. | |
| 6,134,441 A | 10/2000 | Astrom et al. | |
| 6,151,507 A | 11/2000 | Laiho et al. | |
| 6,161,020 A | 12/2000 | Kim | |
| 6,223,045 B1 | 4/2001 | Valentine et al. | |
| 6,252,868 B1 | 6/2001 | Diachina et al. | |
| 6,301,484 B1 | 10/2001 | Rogers et al. | |
| 6,381,465 B1 | 4/2002 | Chern et al. | |
| 6,459,904 B1 * | 10/2002 | Lorello et al. | ................. 455/466 |
| 6,493,558 B1 | 12/2002 | Bernhart et al. | |
| 6,505,052 B1 | 1/2003 | Jou | |
| 6,529,717 B1 | 3/2003 | Blants et al. | |
| 6,560,456 B1 | 5/2003 | Lohtia et al. | |
| 6,606,502 B1 | 8/2003 | Chung Kam Chung et al. | |
| 6,625,460 B1 | 9/2003 | Patil | |

(Continued)

FOREIGN PATENT DOCUMENTS

| | | |
|---|---|---|
| CN | 1570903 A | 7/2003 |
| WO | WO 03/005738 A2 | 1/2003 |

OTHER PUBLICATIONS

State Intellectual Property Office of the People's Republic of China, English Translation of Text of the First Office Action, Application No. 200680004047.9, 6 pages, Nov. 19, 2008.

(Continued)

*Primary Examiner* — Christopher M Brandt
(74) *Attorney, Agent, or Firm* — Baker Botts L.L.P.

(57) ABSTRACT

According to a particular embodiment, a method for distributing messages is provided that includes receiving one or more short message service (SMS) messages. The method also includes distributing one or more of the messages to a selected one or a plurality of short message service center (SMSC) servers.

26 Claims, 2 Drawing Sheets

U.S. PATENT DOCUMENTS

| | | | |
|---|---|---|---|
| 6,650,891 | B1 | 11/2003 | Wierzbitzki et al. |
| 6,760,584 | B2 | 7/2004 | Jou |
| 6,819,932 | B2 | 11/2004 | Allison et al. |
| 6,856,809 | B2 | 2/2005 | Fostick |
| 6,868,274 | B1 | 3/2005 | Ayabe et al. |
| 7,003,307 | B1 * | 2/2006 | Kupsh et al. ............... 455/466 |
| 7,269,431 | B1 * | 9/2007 | Gilbert ......................... 455/466 |
| 2001/0030957 | A1 | 10/2001 | McCann et al. |
| 2002/0107038 | A1 | 8/2002 | Berg |
| 2003/0003932 | A1 | 1/2003 | Corrigan et al. |
| 2003/0058815 | A1 | 3/2003 | Shen et al. |
| 2003/0101427 | A1 | 5/2003 | Clabes et al. |
| 2003/0104827 | A1 | 6/2003 | Moran et al. |
| 2003/0228866 | A1 | 12/2003 | Pezeshki |
| 2004/0043777 | A1 | 3/2004 | Brouwer et al. |
| 2004/0148357 | A1 | 7/2004 | Corrigan et al. |
| 2004/0224693 | A1 * | 11/2004 | O'Neil et al. ............... 455/445 |
| 2005/0078660 | A1 * | 4/2005 | Wood .......................... 370/352 |
| 2005/0135396 | A1 | 6/2005 | McDaniel et al. |
| 2005/0141522 | A1 | 6/2005 | Kadar et al. |
| 2005/0143106 | A1 | 6/2005 | Chan et al. |
| 2005/0266864 | A1 | 12/2005 | Chen et al. |
| 2005/0282567 | A1 | 12/2005 | Ala-Luukko |
| 2006/0003770 | A1 | 1/2006 | Park |
| 2006/0019643 | A1 | 1/2006 | Lai et al. |
| 2006/0067503 | A1 | 3/2006 | Caugherty et al. |
| 2006/0128409 | A1 | 6/2006 | Gress et al. |
| 2006/0148495 | A1 | 7/2006 | Wilson |
| 2006/0189333 | A1 | 8/2006 | Othmer |
| 2007/0275738 | A1 * | 11/2007 | Hewes et al. ................. 455/466 |

OTHER PUBLICATIONS

English Translation of portions of CN 1570903 A, 2 pages total, Nov. 19, 2008.

State Intellectual Property Office of the People's Republic of China, English Translation of Text of the Second Office Action—Application No. 200680004047.9, and portions of English Translation (18 pages), Jun. 2, 2009.

State Intellectual Property Office of the People's Republic of China, English Translation of Text of the Fifth Office Action—Application No. 200680004047.9, Ser. No. 2011011000593100 (7 pages), Jan. 13, 2011.

State Intellectual Property Office of the People's Republic of China, English Translation of Text of the Third Office Action—Application No. 200680004047.9, and portions of English Translation (11 pages), Dec. 4, 2009.

State Intellectual Property Office of the People's Republic of China, English Translation of Text of the Fourth Office Action—Application No. 200680004047.9, Ser. No. 2010082400500420 (9 pages), Aug. 27, 2010.

\* cited by examiner

SYSTEM AND METHOD FOR PROVIDING A PROXY IN A SHORT MESSAGE SERVICE (SMS) ENVIRONMENT

CROSS-REFERENCE TO RELATED APPLICATION

This application is a continuation of U.S. application Ser. No. 11/070,021 filed Mar. 2, 2005 and entitled "System and Method for Providing a Proxy in a Short Message Service (SMS) Environment," which is incorporated herein by reference.

TECHNICAL FIELD OF THE INVENTION

The present invention relates generally to network communications and, more particularly, to a system and a method for providing a proxy in a short message service (SMS) environment.

BACKGROUND OF THE INVENTION

Networking architectures have grown increasingly complex in communications environments. In recent years, a series of protocols and architectures have been developed in order to accommodate a diverse group of end users having various needs. Some of these protocols relate to messaging.

Mobile messaging technology is evolving rapidly to provide multiple services and applications to today's subscribers. With the continued delay of third-generation (3G) deployments and migration to fully packet-switched networks, coupled with the demand for fast-to-market data applications over existing wireless networks, mobile operators often look at expanding their short messaging systems to provide a viable solution for their business needs.

Existing Global System for Mobile Communications (GSM) and code division multiple access (CDMA) mobile networks use Short Message Service (SMS) as a multipurpose data service that enables rapid deployment of data applications without the need for 3G bandwidth capabilities. In fact, SMS traffic is growing exponentially, straining existing mobile operators' signaling networks and infrastructure. The original intention of the SMS protocol was to provide the mobile subscriber with information about the mobile network condition. SMS has recently become a popular protocol for text messaging over the airways.

Traditional messaging deployments are based on a centralized model where all messages (sent and received by the mobile user) are typically directed to messaging centers within the operators' networks. This model is becoming less effective due to the increased traffic and usage levels of messaging in the mobile networks today. The centralized model causes excessive messaging loads on the SMS centers (SMSCs), as well as irregular bursts of messaging traffic that is typically sent over the traditional signaling links, such as signaling system 7 (SS7): originally designed to handle voice signaling and not the bearer data traffic.

Accordingly, a more efficient architecture is necessary to alleviate these problems. The above-identified issues offer a significant challenge to network operators, component manufacturers, and system designers.

SUMMARY OF THE INVENTION

In accordance with some of the teachings of the present invention, techniques for providing optimal messaging protocols are provided. According to certain embodiments, these techniques enable for an effective distribution of workload for a given set of servers, as described in greater detail below. In particular, these techniques can offer increased bandwidth, as well as optimal service quality for a given mobile station.

According to a particular embodiment, a method for distributing messages is provided that includes receiving one or more short message service (SMS) messages. The method also includes distributing one or more of the messages to a selected one or a plurality of short message service center (SMSC) servers.

In a more particular embodiment, the method provides that one or more of the SMS messages are distributed based on their application type. In addition, one or more of the SMS messages are distributed based on their B-address (which reflects the destination short message entity or the destination SME). In yet another more specific embodiment, one or more of the SMS messages are distributed based on a weighted round robin algorithm, which can be executed independent of (or in conjunction with) evaluating the B-addresses of the SMS message. The SMS messages are either segmented or non-segmented. Additionally, a specific B-address in a range of B-addresses may be bound to a specific SMSC within a weighted set.

Embodiments of the invention provide various technical advantages. For example, the architecture of the present invention provides improved flexibility. The current architected mechanism for distributing SMS messages requires that each mobile user/device be programmed with a "home SMSC", which then processes that mobile user's short messages. Distribution of messages across SMSCs is statically bound when a mobile user is activated: instead of optimizing network delivery of the message when initiated by the user. Note also that the routing decision may also be based on the originating SME (or A-address), virtual destination SMSC address, or actual message content.

By providing an intelligent proxy server, the present invention maximizes available bandwidth and capacity for the SMSC. Additionally, the present architecture offers increased scalability for the SMSC architecture. The SMS traffic is distributed based on its application type. Also, decisions can be made based on the B-address, whereby the messages can be distributed across a set of SMSCs: per application. This, in turn, can offer a significant capacity expansion at a substantially lower cost.

Certain technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
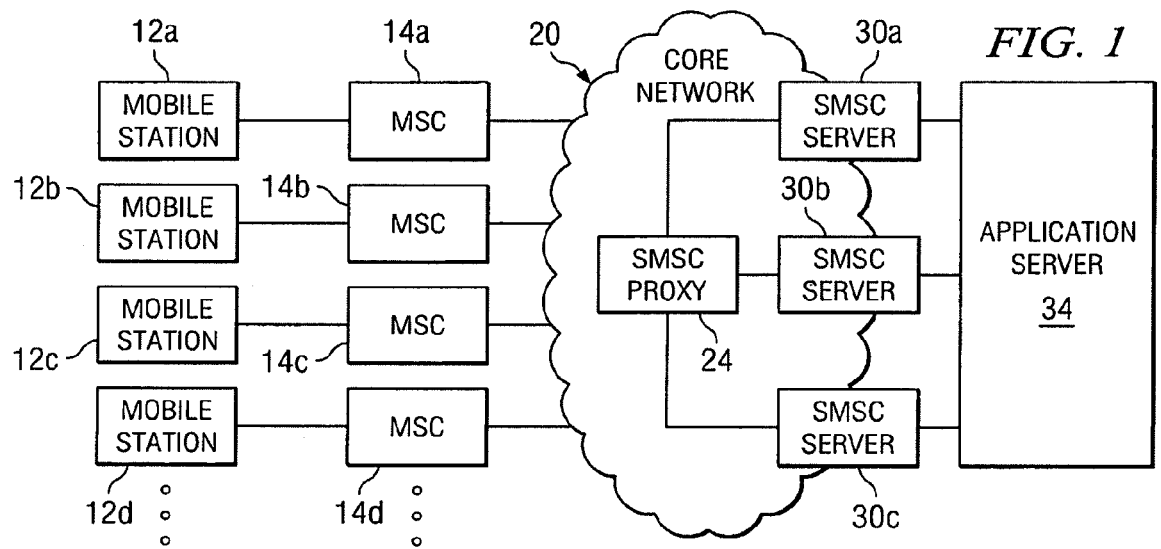
FIG. 1 is a simplified block diagram that illustrates a communication system having elements that support a messaging protocol in accordance with one embodiment of the present invention.

FIG. 1 is a simplified block diagram that illustrates a communication system 10 for providing an effective messaging protocol in a network environment. Communication system 10 comprises a plurality of mobile stations 12a-d and a plurality of mobile switching centers 14a-d, which are coupled to a core network 20. Additionally, communication system 10 includes a short message service center (SMSC) proxy 24, which is coupled to multiple SMSC servers 30a-c. Communication system 10 also includes an application server 34 that is operable to communicate with one or more of the SMSC servers 30a-c. Note that SMSC proxy 24 may be implemented as multiple nodes for network redundancy, extra capacity, etc., where appropriate. SMSC proxy 24 may also be provisioned within a given MSC in alternative embodiments of the present invention.

In accordance with the teachings of the present invention, communication system 10 addresses the problem of how to distribute or to loadbalance (or load share) messages for a given SMSC server. Note that with the growth of SMS traffic, SMS load-distribution systems are being developed in order to reduce the cost of short message service center delivery solutions. The systems are also attempting to provide higher network redundancy and availability for associated customers. Some aspects of the Global System for Mobile (GSM) SMS protocol, such as mobile application protocol (MAP) layer segmentation, make distribution mechanisms based on message content impossible without a stateful solution.

Communication system 10 offers a stateful SMSC proxy 24 for handling mobile originated messages. The solution can be used as either a complement to stateless message redirection solutions (such as architectures that involve multilayer routing (MLR)) or as a stateful SMS message router, which can complement legacy SMSC servers. The SMS MAP dialogue, initiated by the corresponding MSC, can be intercepted and terminated by SMSC proxy 24. SMSC proxy 24 may either redirect the message to another SMSC, or deliver the message itself: allowing a distributed network for SMS delivery. Thus, the provision of a stateful SMSC proxy system is offered to allow an operator to deploy messages in a distributed manner.

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

SMS control and data messages are sent via the traditional circuit-based voice signaling, or signaling system (SS7), network. The multimedia messaging system (MMS), however, uses the packet network introduced in 2.5G and 3G environments by delivering the content over the bearer network (general packet radio service [GPRS] or code division multiple access [CDMA]). Note that in MMS, some of the control messages still traverse the signaling network. Certain architectures enable mobile operators to scale their messaging capacity by increasing the capacity of the messaging center. Capacity is also increased by using more or larger messaging center platforms, as well as by adding signaling bandwidth in the network (circuit and packet).

The majority of messaging traffic can be classified into three categories: 1) mobile originated mobile terminated traffic; 2) mobile originated application terminated traffic; and 3) application originated mobile terminated traffic. Most messaging services and applications deployed over any mobile network currently can be classified into one or more of these categories. A television voting campaign is an example of mobile originated application terminated traffic. A sound clip or animation sent from one mobile network to the other is a mobile originated mobile terminated type of message.

All traffic in the above categories must traverse the messaging center. Peak application use, as might occur during an interactive TV program, for example, can cause a traffic spike that results in serious consequences for wireless networks as messaging centers reach their capacity limitations. Other events, such as sporting events or holidays, can have similar effects on wireless networks.

Communication system 10 provides for a more efficient architecture, which may use a hybrid model that combines a centralized model with a distributed functionality. Each time a user sends an SMS message that message must route to the SMSC. Today this causes a bottleneck scenario during high-volume use of SMS (e.g. when audience interaction, voting, and gaming applications are used, or during seasonal events and holidays, which can cause tremendous spikes in messaging traffic). In certain cases, some operators experience loss of service for extended periods of time simply because there is not sufficient capacity in the messaging centers to handle the traffic.

The present invention overcomes these deficiencies, and others, in offering a stateful proxy solution that achieves the distribution capability, as outlined herein. This is in contrast to current architected mechanisms for distributing SMS messages, which requires that each mobile user/device be programmed with a "home SMSC", which then processes that mobile user's short messages.

The present invention is optimal because it maximizes available bandwidth and capacity for SMSC servers 30-c. Additionally, the present architecture offers increased scalability of the SMSC architecture. The SMS traffic is distributed based on its application type and decisions can be made based on the B-address (which is explained more fully below), whereby the messages can be distributed across a set of SMSCs, per application. This, in turn, can offer a significant capacity expansion at a substantially lower cost.

The present invention also has other positive attributes, such as: 1) decoupling (or offloading) the SS7 link aggregation/termination from the SMSC, allowing it to focus resources on SMS message delivery and application services; 2) providing for deployment of new services to be rolled out on new SMSC servers without requiring more capacity on existing SMSC servers; and 3) providing a migration path by introducing new services on new SMSC servers while allowing old services to continue to be handled by legacy SMSCs.

Communication system 10 can perform distribution across geography and/or multiple nodes. A weighted round-robin algorithm could be used to reach maximum capacity. The algorithm can also account for network availability, congestion, and other parameters, as well as the ability to provide for back-up servers. These operations can be done independent of (or in conjunction with) evaluating the B-addresses, and subsequently performing intelligent application-based distribution. Details relating to the proxy operation, as well as other benefits offered by the present invention, are provided below in conjunction with the following FIGURES.

Turning now to the actual components of FIG. 1, FIG. 1 includes multiple mobile stations 12a-d, which reflect an entity, such as a client, subscriber, end user, or customer that seeks to initiate a communication session or data exchange in communication system 10 via any suitable network. In a particular embodiment, each mobile station 12a-d is equipped such that it can accommodate SMS messaging protocols. Mobile stations 12a-d may operate to use, or to leverage, any suitable device for communications in communication system 10.

Mobile stations 12a-d may further represent a communications interface for an end user of communication system 10. Mobile stations 12a-d may be a cellular or other wireless telephone, an electronic notebook, a computer, a personal digital assistant (PDA), or any other device, component, or object capable of initiating a data exchange facilitated by communication system 10. Mobile stations 12a-d may also be inclusive of any suitable interface to the human user or to a computer, such as a display, microphone, keyboard, or other terminal equipment (such as for example an interface to a personal computer or to a facsimile machine in cases where mobile stations 12a-d is used as a modem).

Mobile stations 12a-d may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

MSCs 14a-d may operate as an interface between a network (e.g. a public switched telephone network (PSTN)) and radio equipment (e.g. a base station controller), and potentially between multiple other mobile switching centers in a network. Some of these elements are not shown in FIG. 1 for purposes of clarity and abbreviation. MSCs 14a-d represent a location that generally houses communication switches and computers and ensures that its cell sites in a given geographical area are properly connected. Thus, the power of the distributed short message routing (DSMR) architecture of the present invention allows messages to be handled closest to their point of origin.

Cell sites refer generally to the transmission and reception equipment or components that connect elements such mobile stations 12a-d to a network, such as core network 20 for example. By controlling transmission power and radio frequencies, MSCs 14a-d may monitor the movement and the transfer of a wireless communication from one cell to another cell and from one frequency or channel to another frequency or channel. In a given communication environment, MSCs 14a-d may also generally handle connection, tracking, status, billing information, and other user information for communications in a designated area.

Core network 20 represents communications equipment, including hardware and any appropriate controlling logic, for providing access for mobile stations 12a-d to conduct telephony services (inclusive of SMS protocols). Various cellular protocols and technologies may be used by core network 20, including but not limited to GSM, TDMA, CDMA, and any other appropriate analog or digital cellular protocol or technology. Furthermore, core network 20 may utilize SS7 protocol for signaling purposes.

Thus, core network 20 may represent a local area network (LAN), a wide area network (WAN), a metropolitan area network (MAN), a wireless LAN (WLAN), a virtual private network (VPN), and/or any other appropriate form of network. Furthermore, elements within core network 20 may utilize circuit-switched and/or packet-based communication protocols to provide for telephony and messaging services. For example, elements within core network 20 may utilize an Internet Protocol (IP).

Application server 34 is a processor that is operable to receive SMS messages and then perform some type of processing for the messages (e.g. a simple voting server). The processing operations may include simple tabulation or aggregation functions. Alternatively, the processing operations may include more sophisticated tasks, such as providing business-type responses to those individuals who cast a vote during a given election scenario. Other processing operations can be performed where appropriate and based on particular needs.

SMSC proxy 24 is a network element that is operable to communicate with SMSC servers 30a-c in order to offer the load distribution techniques as identified herein. SMSC proxy 24 could be a router, a switch, a gateway, a loadbalancer, a bridge, a central processing unit (CPU), or a proprietary element that could be used for purposes of proxying messages that it receives. SMSC servers 30a-c are (similarly) network elements that can receive SMS messages and process them accordingly. As used herein in this document, the term server is generic and, thus, includes any suitable network component, such as those identified immediately above in describing SMSC proxy 24. Additional details related to these devices are provided below with reference to FIGS. 2 and 3.

It should also be noted that the internal structure of SMSC proxy 24 and SMSC servers 30a-c are malleable and can readily be changed, modified, rearranged, or reconfigured in order to achieve their intended operations, as they pertain to the SMS distribution function and the stateful feature outlined herein. Software and/or hardware may reside in both of these elements (or in just one) in order to facilitate the teachings of the distribution mechanism of the present invention. A proprietary signaling may also be provided in each SMSC server 30a-c such that the teachings of the present invention can readily be achieved. Hence, software and/or hardware is provided in SMSC proxy 24, which proxies the messages that it receives in an optimal fashion.

However, due to their flexibility, these elements (SMSC proxy 24 and SMSC servers 30a-c) may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof.

Figure 2:
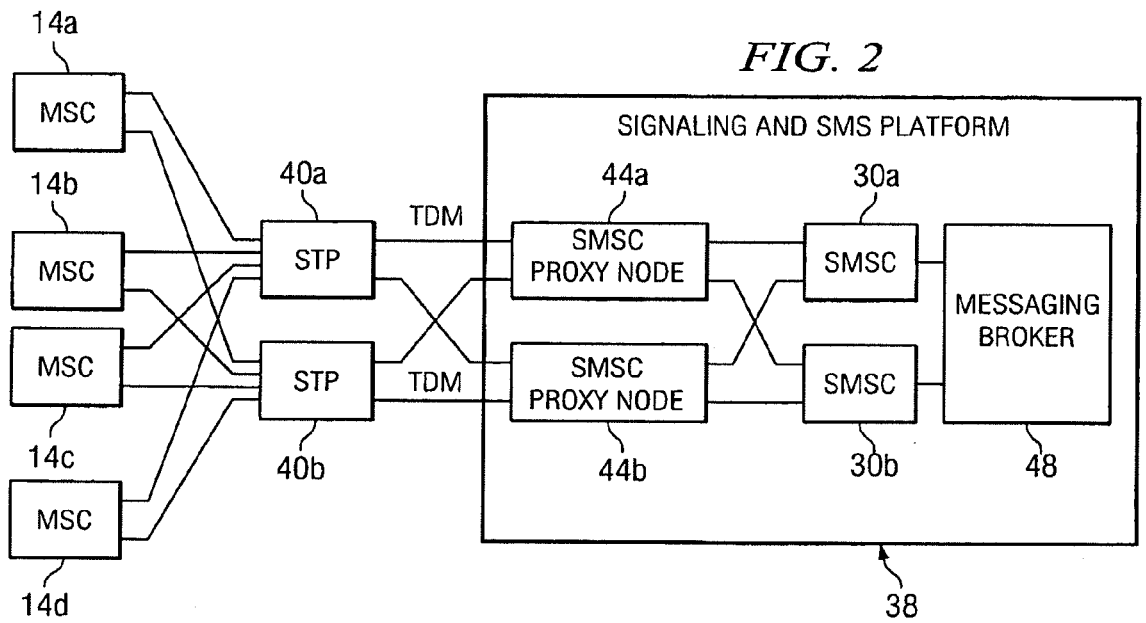
FIG. 2 is a block diagram illustrating an example configuration that offers details relating to one embodiment of the communication system.

FIG. 2 is a simplified block diagram illustrating additional details relating to communication system 10. In addition to the elements of FIG. 1, FIG. 2 further includes multiple signaling transfer points (STP) 40a-b and multiple SMSC proxy nodes 44a-b, which can be IP transfer points (ITP). In one embodiment, these elements communicate using a TDM protocol, as is illustrated. A signaling platform 38 of FIG. 2 includes two example SMSC servers 30a-b, which are coupled to a messaging broker 48.

A messaging platform, which may be coupled to (or be part of) messaging broker 48, has a database of short codes and it can interpret where the message is to be delivered. Generally, a group of application servers reside behind messaging platform 48.

To fully understand the operations of the elements of FIG. 2, a number of ancillary concepts should be understood. During the provisioning process, each mobile user is assigned a home SMSC address. Whenever the end user of the phone elects to send an SMSC message, the message is sent to its corresponding MSC. The messages can be sent over the SS7 network. The SMSC address is provided to the MSC, whereby the MSC understands that the end user is attempting to submit the message to its specific home SMSC address.

The MSC takes responsibility for delivering the message to the ultimate destination. Thus, it should be recognized that there are two addresses involved in this arrangement. The first address is the "first stop" of the message, which relates to a corresponding MSC. The second address is the ultimate destination of the message (e.g. to another end user, who will subsequently receive the message and read it, or to a voting server, or to a messaging broker, etc.).

One problem associated with this scenario is that the SMSC servers offer a single point of failure. Additionally, the SMSC servers are not loadbalanced (i.e. a single SMSC server could be overwhelmed, whereas another may not be near capacity). Note that the predominant solution of static distribution is performed by assigning groups of subscribers to different SMSC addresses. This is simply not load-based. It should also be noted that SMSC servers are provisioned with respect to service. For example, an SMSC server would generally be relegated certain services to perform for a given group of end users.

The configuration of FIG. 2 offers a solution that evaluates the mobile-originated (sometimes abbreviated MO) SMS message and determines, based on the configuration and availability of the current SMSC servers, where this message should be serviced. Hence, the algorithm can consider network availability and network congestion of the SMSC server. This offers a server-loadbalancing type of feature for the system. It should be noted that the architecture does not have to be centralized. For example, this feature may be distributed into the MSC sites. In such a case, routing is not necessarily done through the core network, but could be done through an IP network. Thus, the present invention may operate optimally in both a distributed and a centralized architecture.

To understand why SMSC proxy 24 is so valuable, the audience should comprehend how routing decisions are generally made using MLR. Many routing decisions are made on the B-address (i.e. the ultimate destination). But this could present a problem for MLR protocols because the B-address may not be present and the SMS message is missing in certain scenarios. MLR is generally a state-less architecture, whereby if it encountered such a scenario, it would simply pick an SMSC server to which to route the message.

However, the ITP would not make an informed loadbalancing decision based on ideal criteria for selecting an SMSC. The ITP does not have the requisite information (the B-address) to make an intelligent load-sharing decision. Hence, without the use of SMSC proxy 24, ITP (or any other protocol, which did not have the B-address) would have to pick an arbitrary SMSC server to receive the message. This routing could be correct, or it could terribly deficient (e.g. routing a message to a legacy SMSC, which is not even capable of processing this type of message).

In sum, the distribution mechanism in any such architecture must be intelligent such that it can route messages based on B-addresses for both non-segmented and segmented messages. The segmented messages are larger messages in size and, thus, need to be accounted for.

It should be recognized that segmented messages are continuing to grow in size. For example, application servers currently have the ability send response-like business traffic back to the end user, who initiated the message. Consider a case where an end user elects to vote for some event, which is being televised. After submitting his vote of choice, an application server can then respond with a message such as: "Congratulations, you are the $1,000,000^{th}$ voter in this election. You have just won a trip to Hollywood." In other cases, these responses could be simply solicitations for consumer spending (e.g. advertisements, marketing campaigns, etc.). Hence, many advertisers do not want to be restricted to a designated character limit (e.g. a 70 character limit message payload character limit, or message content character limit). For example, in GSM networks, MSC implementations may segment the MAP dialogue with SMS payloads as small as 70 characters.

In the architecture of FIG. 2, the ITP becomes a stateful SMSC proxy. The dialogue request is terminated at SMSC proxy 24 because the dialogue should be routed based on the B-address. The dialogue is terminated in order to obtain the next message, which contains the SMS message. Once the SMS message is received, a new dialogue is opened and SMSC proxy 24 sits between the two dialogues and effectively ties them together. Hence, SMSC proxy 24 can open the appropriate dialogue with the appropriate SMSC server based on the selection algorithm used.

In operation of an example flow, the ITP can be leveraged to achieve the teachings of the present invention. When the MSC sends an SMS message into the network, it is actually providing the called party address (CdPa), which is the destination SMSC address, or SMSC address configured to handle the message (e.g. E.164 address of the called party). The calling party's address is the address of the MSC in this case. Hence, as outlined above, SMSC proxy 24 withholds the response to the MSC until the message submission result from the SMSC server is received.

Figure 3:
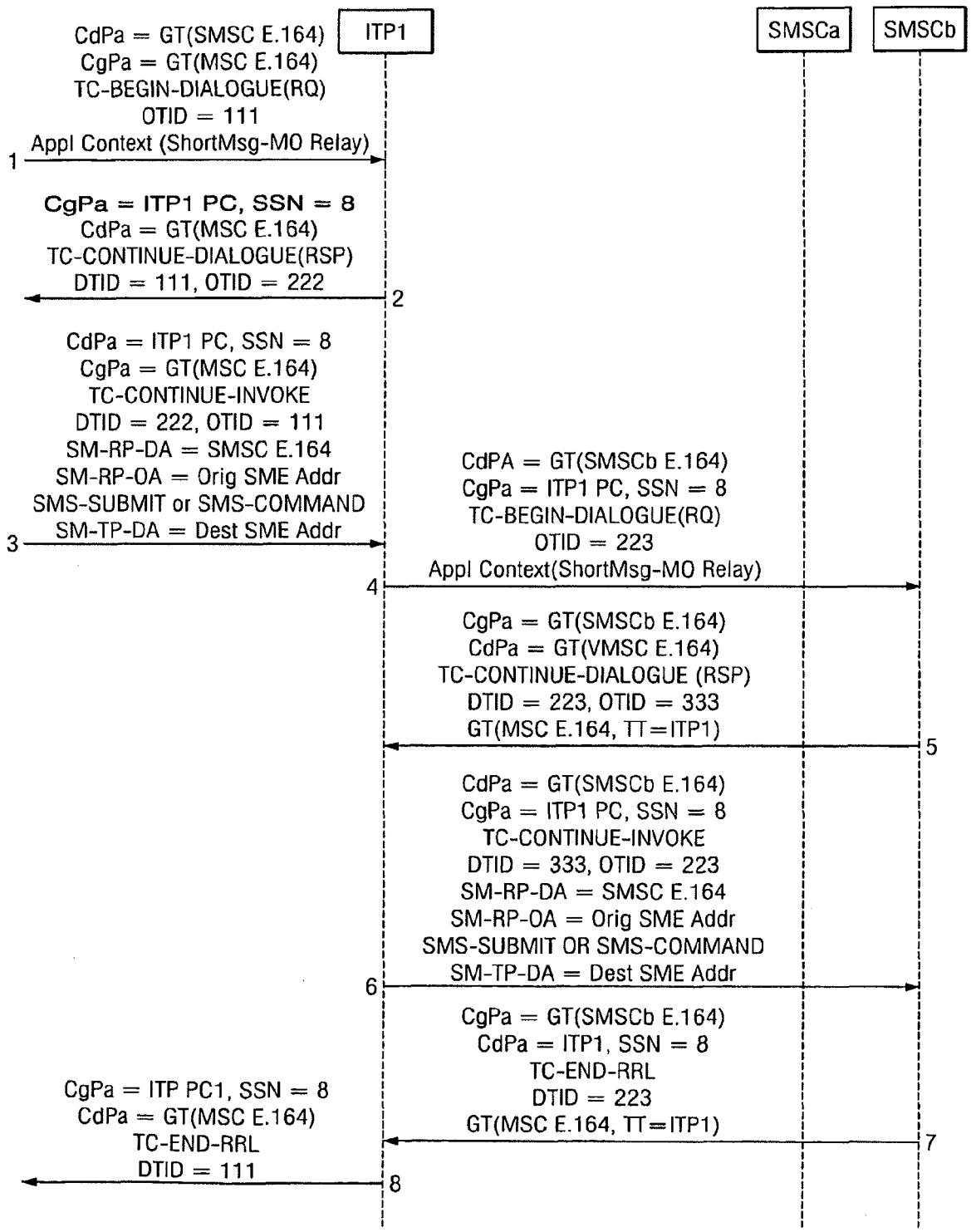
FIG. 3 is a simplified flow diagram associated with a method for providing the messaging protocol in the communication system.

Before turning to the example operation of FIG. 3, it may be helpful to offer some overview, as to the way in which some of the more intricate signaling takes place in communication system 10. As highlighted above, SMSC proxy 24 provides the capability to loadbalance segmented SMS messages. Moreover, ITP's MLR functionality today is purely a stateless advanced routing system. As such, it is unable to both load balance and ensure that a segmented SMS message will be routed in its entirety to a specific SMSC. SMSC proxy 24 provides the functionality necessary for the loadbalancing of segmented messages and still ensures that each message is delivered in its entirety to a specific SMSC.

SMSC proxy 24 supports MLR SMS MO routing when the GSM SMS-MO message is segmented into two TCAP dialogue messages. SMSC proxy 24 allows routing of segmented GSM SMS-MO message based on all application layer parameters supported for non-segmented GSM SMS-MO messages. SMSC proxy 24 further allows segmented GSM SMS-MO messages to be routed using the same MLR address tables supported for non-segmented GSM SMS-MO messages. The originating MSC should receive an SMS MO ACK or NAK within a specified time (e.g. 10 seconds) that indicates whether the message was successfully accepted by the SMSC.

In order to route a segmented SMS MO message to a destination based on an application layer parameter (e.g., the B-address), the ITP can respond to an MSC's BEGIN dialogue request. This action can cause the MSC to send the INVOKE component containing the MOForwardSM MAP operation and SMS parameters in a CONTINUE message.

SMSC proxy 24 application can respond to MO-ForwardSM dialogue requests from MSCs and couple them with an MO-ForwardSM dialogue with the selected destination SMSC. The SMS MO ACK will not be returned to the MSC until an SMS MO response is received from the destination SMSC, or an error/timeout occurs. This sequence allows the MSC to receive the actual submission status from the SMSC, and absolves SMSC proxy 24 from having to store the short message for later submission.

Furthermore, in the event that the destination SMSC returns an ERROR component, SMSC Proxy 24 will act upon the received error type. The error may be transparently passed to the originating MSC, it may be translated into a different response type, or it may trigger selection of another destination SMSC. For example, if the selected destination SMSC indicates that it is experiencing application layer congestion, then the SMSC Proxy may either select another uncongested destination SMSC, or translate the congestion error into a procedural error to avoid triggering MSC-based throttling when the SMSC Proxy and the majority of destination SMSCs are still available.

The SMSC proxy address is returned to the MSC in a CONTINUE response to an empty BEGIN request for the MOforwardSM application context, and all subsequent dialogue messages. This address must be uniquely routable by the SS7 network layers to the SMS Proxy ITP responding to the BEGIN. This address will typically be specified as an E.164 global title address, or the configured PC and SSN of the SMS Proxy ITP. The MSCs are generally capable of supporting the change of a dialogue's destination address in the first CONTINUE Message. If the MSC does not support the changing of the dialogue's destination address, then the MSC can use SCCP Class 1 when initiating the segmented/multi-message dialogues to ensure that the same SMS MO proxy ITP will process all messages in the dialogue.

The MSC proxy address (or a MAP protocol extension for carrying the originating/servicing MSC address could be used here, which would allow the SCCP CgPA to be the SMSC proxy address) is the address sent by the SMSC proxy in the SCCP CgPA within the proxied MOforwardSM transaction. To the SMSC, this address represents the servicing (or originating) MSC of the origin SME, and is only available to the SMSC via the SCCP CgPA field. SMSCs may have features that require knowledge of the true servicing MSC address, such as mobile number portability, prepaid billing, postpaid billing, messaging statistics, etc. SMSC proxy 24 should also provide an SCCP CgPA address, which is uniquely routable by the SS7 network layers to the SMS MO proxy ITP to ensure proxied dialogue integrity.

SMSC proxy 24 can convert the servicing MSC calling party address into a global title with a reserved translation type value that is dedicated for use by that specific SMSC proxy 24. Nodes performing global title translation from the SMSC back to the SMS MO proxy ITP are provisioned to translate all global title addresses using the reserved translation type value to the SMS MO proxy ITP. The servicing MSC calling party address conversion can vary based on the routing indicator value and presence of a global title (GT) within the received SCCP CgPA.

Turning now to FIG. 3, FIG. 3 is a simplified flow diagram of an example operation associated with communication system 10. The method begins at STEP 1, where ITP1 determines that the CdPA SMSC address is an MLR trigger, and parses the TCAP layer. The message is identified as a segmented SMS MO message based on the combination of application context value in the dialogue portion and the lack of an INVOKE component. The message is routed to the SMSC proxy application running as a local subsystem on ITP1.

At STEP 2, ITP1 terminates the TCAP BEGIN request, and responds with a TCAP CONTINUE. GSM MAP version 1 dialogues are not segmented. The ITP can accept segmented GSM MAP version 2 and 3 ShortMsg-MO Relay application contexts. When generating the CONTINUE, ITP1 will insert its own local address into the CgPa field, which will ensure that the remainder of the dialogue reaches ITP1. This is standard TCAP behavior per ITU Q.774.

STEP 3 illustrates that the MSC sends the SMS-SUBMIT or SMS-COMMAND message to ITP1. At STEP 4, ITP1 routes the message to the local SMSC proxy. The message is correlated to the existing dialogue (TID=222), and the SMSC proxy subsystem then selects the appropriate destination SMSC based on the SM-TP-DA short code or other parameter(s) (e.g. B-address, SMSC weight, availability, congestion, or other application layer parameters). Once selected, ITP1 initiates a new dialogue with the destination SMSCb. At STEP 6, ITP1 routes the message to the local SMSC proxy subsystem. The message is correlated to the existing dialogue (TID 223), and the relay application then sends the SMS message to SMSCb. Note that in steps 5 and 7, the servicing MSC address is preserved, where 'TT' represents a translation type unique to ITP1.

STEPS 6, 7, and 8 collectively show that ITP1 routes the message to the local SMSC proxy subsystem. The message is correlated to an existing dialogue, and the destination-side dialogue is ended. The SMSC proxy application or subsystem then ends the dialogue with the originating MSC based on the information received from SMSCb. If SMS user information was returned from SMSCb, then that information would be returned to the MSC.

It should be noted that the preceding discussions illustrate particular methods for effecting an optimal SMS message protocol. However, these discussions illustrate only exemplary methods of operation. It is critical to note that the stages and steps in the FIGURES illustrate only some of the possible scenarios and operations that may be executed by, or within, the present system. Some of these stages and/or steps may be deleted or removed where appropriate, or these stages and/or steps may be modified, enhanced, or changed considerably without departing from the scope of the present invention.

In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the proxy tasks and operations of the elements and activities associated with executing suitable distribution functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the present invention can easily be used in GSM architectures, but from a conceptual level, the teachings of the present invention can readily be applied to IS41 configurations. Considerable flexibility is provided by the present invention, as the broad concept, as explained herein, is replete with any such applications.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. An apparatus for distributing messages, comprising:
a short message service center (SMSC) proxy configured to communicate with a plurality of SMSC servers, the SMSC proxy operable to:
receive an SMS message;
determine, based on an application type of the SMS message, one or more of the plurality of SMSC servers that can accommodate the application type; and
distribute the SMS message to a selected SMSC server among the determined one or more SMSC servers.

2. The apparatus of claim 1, wherein the SMSC proxy is operable to distribute the SMS message to the selected SMSC server among the determined one or more SMSC servers based on network availability.

3. The apparatus of claim 1, wherein the SMSC proxy is operable to distribute the SMS message to the selected SMSC server among the determined one or more SMSC servers based on network congestion.

4. The apparatus of claim 1, wherein the SMSC proxy is operable to distribute the SMS message to the selected SMSC server among the determined one or more SMSC servers based on one or more of the following:
a B-address of the SMS message;
an A-Address of the SMS message; and
content of the SMS message.

5. The apparatus of claim 1, wherein the SMSC proxy is operable to distribute the SMS message to a selected SMSC server among the determined one or more SMSC servers based on a weighted round robin algorithm.

6. The apparatus of claim 1, wherein:
the SMSC proxy is provided in one or more mobile switching center (MSC) sites; and
routing of the SMS message can be done through an Internet Protocol (IP) network.

7. The apparatus of claim 1, wherein:
the SMSC proxy is coupled to an IP transfer point (ITP) that reflects a stateful proxy,
the ITP is operable to communicate with-the plurality of SMSC servers.

8. A method for distributing messages, comprising:
receiving a short message service (SMS) message;
determining, based on an application type of the SMS message, one or more of a plurality of SMSC servers that can accommodate the application type; and
distributing the SMS message to a selected SMSC server among the determined one or more SMSC servers.

9. The method of claim 8, wherein distributing the SMS message to the selected SMSC server among the determined one or more SMSC servers comprises distributing the SMS message based on based on network availability.

10. The method of claim 8, wherein distributing the SMS message to the selected SMSC server among the determined one or more SMSC servers comprises distributing the SMS message based on based on network congestion.

11. The method of claim 8, wherein distributing the SMS message to the selected SMSC server among the determined one or more SMSC servers comprises distributing the SMS message based on one or more of the following:
a B-address of the SMS message;
an A-Address of the SMS message; and
content of the SMS message.

12. The method of claim 8, wherein distributing the SMS message to a selected SMSC server among the determined subset of SMSC servers comprises distributing the SMS message based on a weighted round robin algorithm.

13. The method of claim 8, comprising routing the SMS message through an Internet Protocol (IP) network.

14. The method of claim 8, wherein:
an IP transfer point (ITP) that reflects a stateful proxy is provided; and
the ITP is operable to communicate with the plurality of SMSC servers.

15. The method of claim 8, comprising terminating a dialogue request received from a selected one of a plurality of MSCs because the dialogue is to be routed based on the B-addresses of the SMS message.

16. The method of claim 15, wherein the dialogue request is terminated in order to obtain a next message, which contains the SMS message.

17. The method of claim 16, comprising opening a new dialogue with the selected SMSC server, wherein:
the two dialogues are tied together; and
an address associated with an origination or a servicing MSC can be preserved.

18. The method of claim 17, comprising withholding a response to the selected one of the plurality of MSCs until a result from the selected SMSC server is received.

19. A non-transitory computer readable medium comprising software for distributing messages, the software comprising computer code and when executed to perform operations comprising:
receiving a short message service (SMS) message;
determining, based on an application type of the SMS message, one or more of a plurality of SMSC servers that can accommodate the application type; and
distributing the SMS message to a selected SMSC server among the determined one or more SMSC servers.

20. The non-transitory computer readable medium of claim 19, comprising distributing the SMS message to a selected SMSC server among the determined one or more SMSC servers based on network availability.

21. The non-transitory computer readable medium of claim 19, comprising distributing the SMS message to a selected SMSC server among the determined one or more SMSC servers based on network congestion.

22. The non-transitory computer readable medium of claim 19, comprising distributing the SMS message to a selected SMSC server among the determined one or more SMSC servers based on a weighted round robin algorithm.

23. The non-transitory computer readable medium of claim 19, wherein the code is operable to perform operations comprising terminating a dialogue request received from a selected one of a plurality of MSCs because the dialogue is to be routed based on the B-addresses of the SMS message.

24. The non-transitory computer readable medium of claim 23, wherein the dialogue is terminated in order to obtain a next message, which contains the SMS message.

25. The non-transitory computer readable medium of claim 24, wherein the code is operable to perform operations comprising opening a new dialogue with the selected SMSC server, wherein the two dialogues are tied together.

26. The non-transitory computer readable medium of claim 19, wherein the code is operable to perform operations comprising withholding a response to the selected one of the plurality of MSCs until a result from the selected SMSC server is received.

* * * * *